(12) United States Patent
Wang (10) Patent No.: US 11,448,439 B1
(45) Date of Patent: Sep. 20, 2022

(54) REFRIGERANT CAN TAP

(71) Applicant: Bokang Wang, Newark, DE (US)

(72) Inventor: Bokang Wang, Newark, DE (US)

(73) Assignee: Weitron, Inc., Newark, DE (US)

( * ) Notice: Subject to any disclaimer, the term of this patent is extended or adjusted under 35 U.S.C. 154(b) by 141 days.

(21) Appl. No.: 16/939,458

(22) Filed: Jul. 27, 2020

Related U.S. Application Data (63) Continuation of application No. 15/948,341, filed on Apr. 9, 2018, now Pat. No. 10,724,775.

(60) Provisional application No. 62/485,135, filed on Apr. 13, 2017, provisional application No. 62/508,413, filed on May 19, 2017.

(51) Int. Cl.

| | |
|---|---|
| *F25B 45/00* | (2006.01) |
| *B65D 47/06* | (2006.01) |
| *F16K 1/04* | (2006.01) |
| *B65D 51/22* | (2006.01) |
| *F17C 13/04* | (2006.01) |
| *F16K 1/30* | (2006.01) |

(52) U.S. Cl.
CPC .............. *F25B 45/00* (2013.01); *B65D 47/06* (2013.01); *B65D 51/225* (2013.01); *F16K 1/04* (2013.01); *F16K 1/303* (2013.01); *F17C 13/04* (2013.01); *F25B 2345/001* (2013.01); *F25B 2345/006* (2013.01)

(58) Field of Classification Search
CPC ................ F25B 45/00; F25B 2345/001; F25B 2345/006; B65D 47/06; B65D 51/225; F16K 1/04; F16K 1/303; F17C 13/04; B60H 1/00585; B25B 27/24
USPC .......................................................... 62/292
See application file for complete search history.

(56) References Cited

U.S. PATENT DOCUMENTS

| | | | |
|---|---|---|---|
| 6,142,345 A * | 11/2000 | Laible ................. | B67D 7/0277 |
| | | | 222/189.1 |
| 10,724,775 B1 * | 7/2020 | Wang ...................... | F16K 1/04 |
| 2011/0168277 A1 | 7/2011 | Dulac | |
| 2012/0192576 A1 * | 8/2012 | Carrubba ............... | F25B 45/00 |
| | | | 62/149 |
| 2015/0203278 A1 * | 7/2015 | Koban .................... | F16K 1/303 |
| | | | 222/544 |

\* cited by examiner

*Primary Examiner* — Henry T Crenshaw
*Assistant Examiner* — Kamran Tavakoldavani
(74) *Attorney, Agent, or Firm* — Tuggle Duggins P.A.; Blake P. Hurt (57) ABSTRACT

A refrigerant can tap with a tap body having an inlet and an outlet, an internal pin, a gasket, and a backflow preventer. The inlet and outlet of the tap body have a one-half inch ACME left-handed thread, the inlet for engaging the self-sealing valve of an R-1234yf can.

3 Claims, 7 Drawing Sheets

REFRIGERANT CAN TAP

This is a continuation of and claims benefits under pending prior application Ser. No. 15/948,341 filed 9 Apr. 2018, which is a non-provisional patent application of U.S. provisional patent application Ser. No. 62/485,135 filed 13 Apr. 2017, and U.S. provisional patent application Ser. No. 62/508,413 filed 19 May 2017, each of which are incorporated by reference in their entirety herein.

FIELD OF THE INVENTION

The invention herein pertains to a refrigeration system tool and in particular to a can tap for engagement with the self-sealing valve of a R-1234yf refrigerant can with a one-half inch ACME left-handed thread.

DESCRIPTION OF THE PRIOR ART AND OBJECTIVES OF THE INVENTION

It is common practice to introduce fluid into a refrigeration system, such as an automotive air conditioning system, from a container in which the fluid is commercially packaged. For example, relatively small quantities of refrigerants such as R-134a (a hydrofluorocarbon or "HFC") are typically packaged in cylindrical cans. A special-purpose tool is commonly utilized to dispense the refrigerant and/or other fluid (e.g., lubricant, leak detector, seal rejuvenator, and the like) into the refrigeration system.

Recently, due to environmental global warming concerns of HFCs, regulatory bodies have approved the use of R-1234yf refrigerant, a hydro-olefin (HFO), for many refrigerant applications. These regulatory agencies have also required that a specific valve thread (a one-half inch ACME left-handed thread) be used on any commercial container that holds R-1234yf. Therefore, the prior art tools that are configured to securely engage R-134a cans will not accommodate the R-1234yf refrigerant cans with a self-sealing valve, as they (1) require a left-handed, compared to a right-handed, thread pattern (i.e. a different thread pattern); (2) have a self-sealing valve on the can compared to regular caps which only have a thin metal seal that is destroyed in liberating the refrigerant.

One disadvantage of can taps currently on the market is that they do not have a backflow preventer. While charging the automotive A/C system, the can should be connected to the low-pressure service port of the A/C system. However, if a technician accidentally connects it to the high-pressure service port, using a can tap without a backflow preventer will be dangerous, as the refrigerant from the system may flow into the can and cause it to explode. This is especially dangerous when technicians are working with R-1234yf since it is a flammable refrigerant. Therefore, a further objective of this invention is to include an integrated backflow preventer in the can tap.

Therefore, it is desirable to have a tool that can safely engage a self-sealing valve, R-1234yf refrigerant can with a corresponding thread pattern to communicate with the R-1234yf refrigerant can and a backflow preventer for safety. In the preferred embodiment of the tool, the thread pattern is defined as a one-half inch ACME left-handed thread pattern and the aforementioned backflow preventer.

SUMMARY OF THE INVENTION

In carrying out the principles of the present invention, in accordance with an embodiment thereof, a refrigerant can tap is provided which is configured to permit convenient use thereof with self-sealing valve R-1234yf refrigerant cans which have a one-half inch ACME left-handed thread pattern.

The aforesaid and other objectives are realized by providing a refrigerant can tap with a tap body which has an inlet and an outlet, an internal pin, a gasket, and a backflow preventer. The inlet and outlet of the tap body have the one-half inch ACME left-handed thread, and therefore it successfully engages with the R-1234yf can which is required by law to be sold with this thread pattern. The backflow preventer is located at the connection between the outlet and the throat on the tap body. The internal pin has a flow portion in fluidic communication with the inlet and the outlet of the tap body. The internal pin has a blunt depressor configured for (i.e. suitably sized and shaped) operating the valve on the container. The flow portion of the pin allows fluid to flow between the tap body and the internal pin. The can tap has a gasket comprising a material preventing the refrigerant from leaking while charging.

DETAILED DESCRIPTION OF THE PREFERRED EMBODIMENT AND OPERATION OF THE INVENTION

Figure 1:
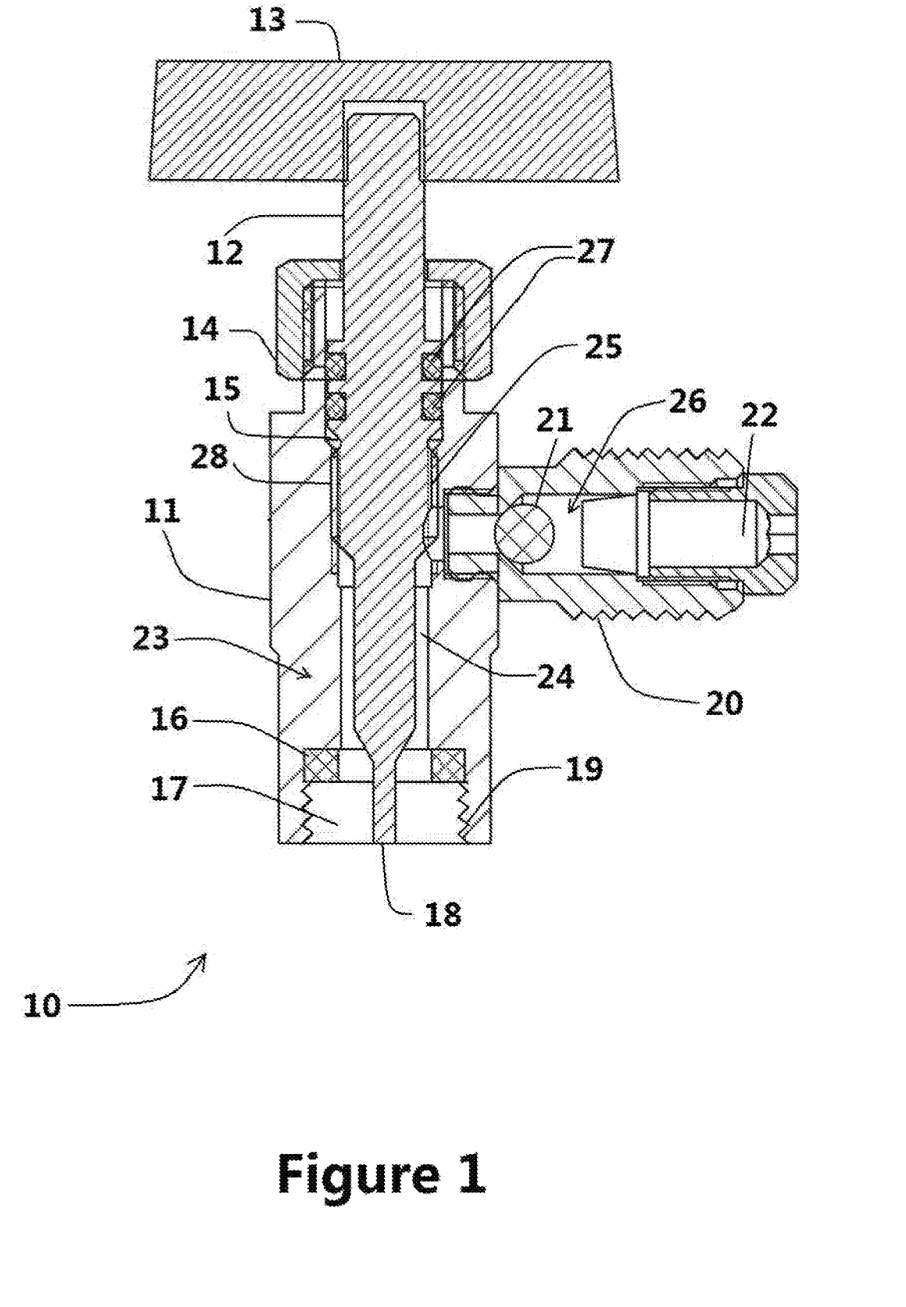
FIG. 1 is the cross-sectional side view of a can tap tool with backflow preventer, cut along line 29 of FIG. 3.
Figure 2:
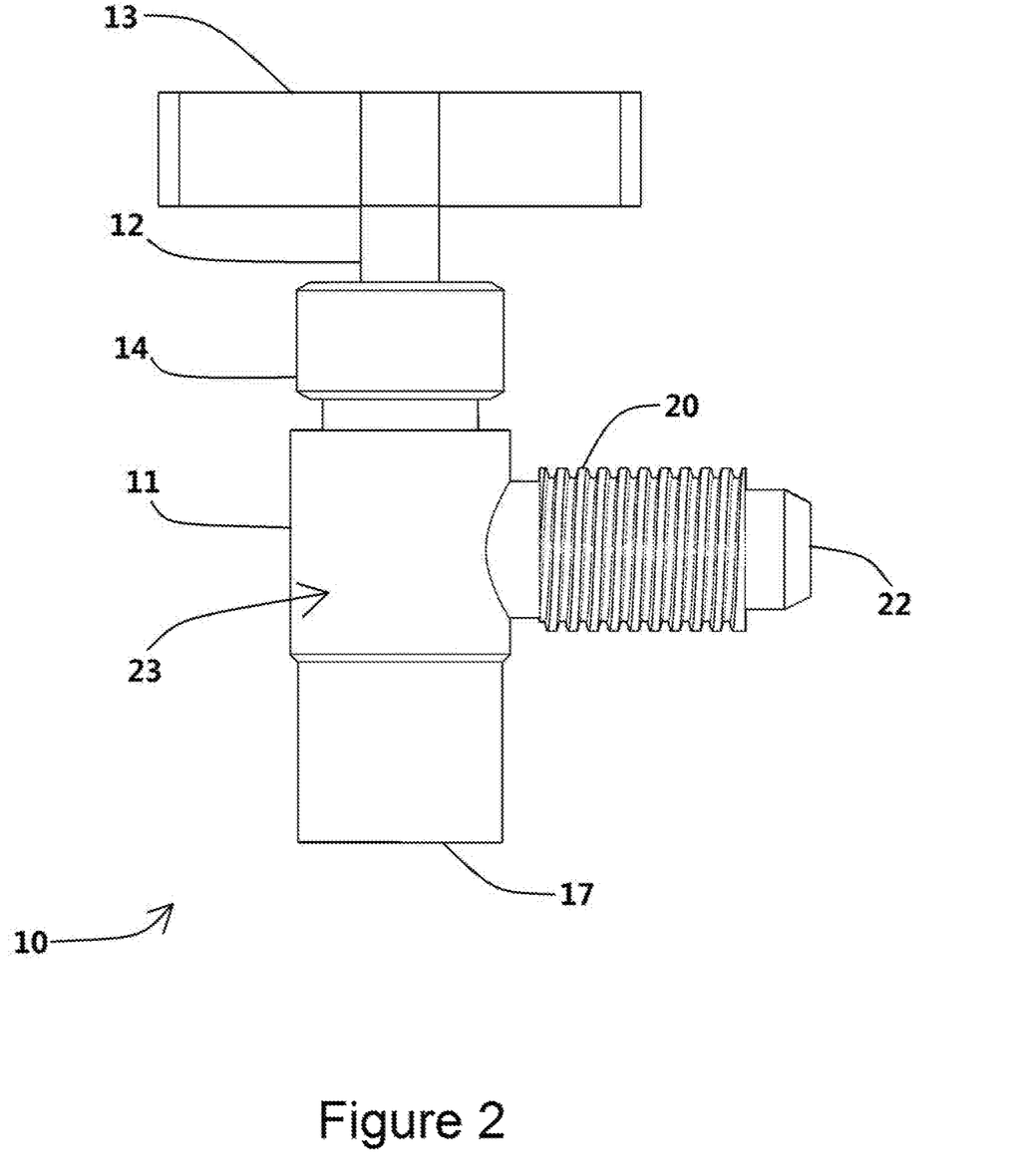
FIG. 2 is an elevated side view of the can tap tool with backflow preventer of FIG. 1.
Figure 3:
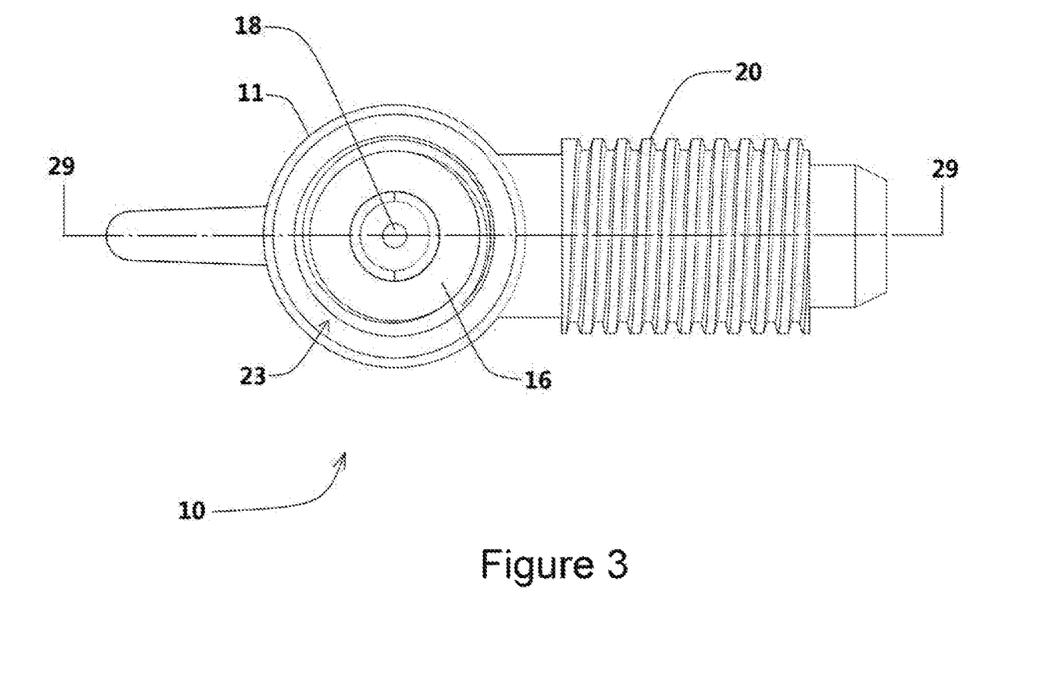
FIG. 3 is a bottom plan view of the can tap tool with backflow preventer of FIG. 1.
Figure 4:
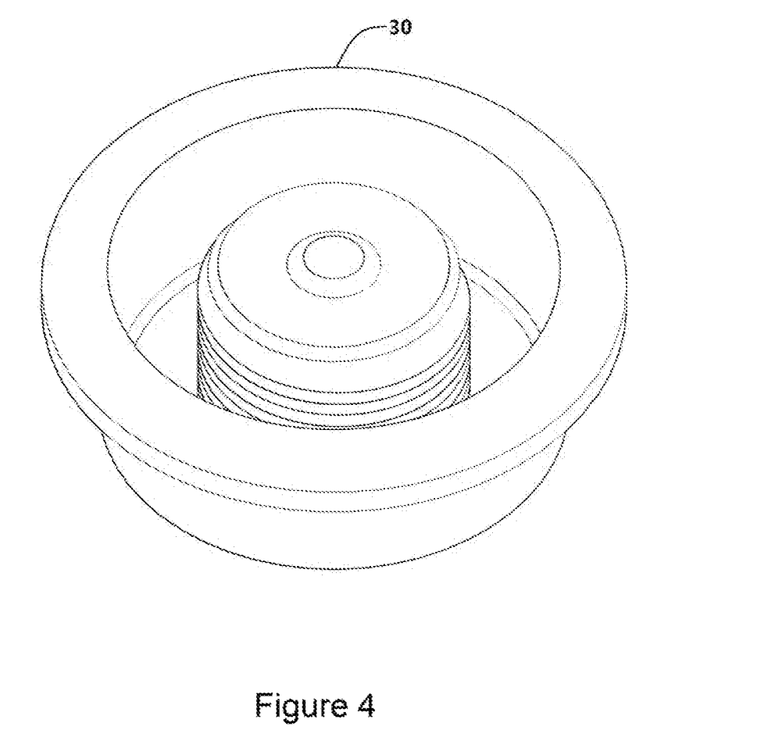
FIG. 4 is a perspective view of a self-sealing valve of a R-1234yf refrigerant can.

For a better understanding of the invention and its operation, turning now to the drawings, Figures (FIGS. 1-5 illustrate the preferred embodiment of can tap tool 10 for use with a self-sealing valve for dispensing R-1234yf refrigerant fluid into a refrigeration system. FIG. 1 is showing an elevational side, cross-section view of can tap tool 10, cut along the line 29 in FIG. 3. FIG. 2 is an elevated side view of can tap tool 10, preferably a R-1234yf can tap for use with a self-sealing valve. FIG. 3 is a bottom plan view of can tap tool 10. FIG. 4 illustrates the self-sealing valve 30 for R-1234yf with a one-half inch ACME left-handed thread. The preferred embodiment of tool 10 includes one-half inch ACME left-handed inlet threads and one-half inch ACME left-handed outlet threads as described in further detail below; however it should be understood that this selection comports with the selection of the regulatory body's determination that such a thread configuration is to be used in combination with R-1234yf refrigerant, and it should further be appreciated that the instant tool could be modified for the same purpose were the details of the left-handed thread to be changed in the future without departing from the spirit of the instant invention. Tool 10 is formed from a tap body 11 which has inlet 17 and outlet 22, internal pin 12, gasket 16, and backflow preventer 21. These components are preferably formed from a stable (i.e. not chemically reactive with liquid or gaseous coolant materials), structurally robust material resistant to deformation from the torsional pressure typically exerted on these types of tools in their normal operating environment, although no limitation is intended that all components be formed from the same material(s). For example, and not by way of limitation, polymeric or metallic materials may form some or all of the components of can tap tool 10, and not all components need be formed from the same material, although they may as desirable.

Referring specifically to FIGS. 1, 2, 3, 5, and 7, can tap tool 10 is comprised of tap body 11, pin 12, gasket 16, inlet 17, backflow preventer 21, and the outlet 22. Tap body 11 includes nut 14 and main body 23 which locks pin 12 in the main body 23. Tap body 11 defines a fluid channel or throat 24, which is in fluidic communication with tap outlet 22 and tap inlet 17. In the preferred embodiment, throat 24 is a lesser diameter than that defined by inlet 17. The internal thread 25 formed on the main body 23 frictionally engages to and works cooperatively with the internal thread(s) 28 (FIGS. 1 and 5) formed on the surface of pin 12 by which the pin 12 can move vertically upwards or downwards. Inlet thread 19 and outlet thread 20 preferably have the same one-half inch ACME left-handed thread and it therefore can work with the R-1234yf can which also defines the one-half inch ACME left-handed thread pattern on self-sealing valve 30, although it should be recognized that varying left-handed threads may be defined by inlet 17 and outlet 22 in order to accommodate a variety of R-1234yf refrigerant cans and associated accessories. There are at least four classes of general purpose ACME threads, defined as 2G, 3G, 4G, and 5G, respectively. Each class provides some clearance on all standard size diameters for free movement, and are used in assemblies with the internal thread rigidly fixed and movement of the external thread in a direction perpendicular to its axis limited by its bearing or bearings. Can tap tool 10 also preferably includes gasket 16 comprising a resilient material preventing the refrigerant from leaking while charging, for example (but not limited to) rubber.

Backflow preventer 21 is preferably positioned in the connection 26 between outlet 22 and main body throat 24. Backflow preventer 21 allows the fluidic communication from main body throat 24 to outlet 22, and it can stop the fluidic communication from outlet 22 to main body throat 24 as desired by a user. Backflow preventer 21 is preferably a spherical shape defining a diameter that is larger than the fluid passageway between body throat 24 and outlet 22 but other shapes and sizes of backflow prevention structures may serve similarly well, and thus should be considered within the scope of backflow preventer 21.

Pin 12 is attached to handle 13 that may be turned to raise or lower pin 12 by a user, which frictionally engages tap body 11 through tap body internal threads 25 and pin internal thread 28. Pin 12 is preferably cylindrical in nature and may include a greater diameter at an upper portion that is located more proximate handle 13 and a lesser diameter at a lower portion positioned at an opposing end, the lesser diameter more desirable for engaging the self-sealing valve 30 (see FIG. 4) protecting the R-1234yf refrigerant within an associated can (not shown). Turning handle 13 in a first direction will lower pin 12 as seen in FIG. 1 to open the R-1234yf self-sealing valve and turning handle 13 a second (and opposing) direction will raise pin 12 to close the R-1234yf self-sealing valve. Pin 12 may include one or more O-ring(s) 27 to prevent the refrigerant from leaking through top throat 15. O-ring(s) 27 are preferably formed from a resilient material, including (but not limited to) rubber. Pin 12 terminates in blunt depressor 18 at a proximal end oriented in a longitudinally opposing relation relative to handle 13. Can tap tool 10 comprises tap outlet 22 that can accommodate a hose, conduit, or other connector through threaded portion 20 to carry fluid from a can of refrigerant.

Gasket 16 is located proximate to and circumscribing tap body inlet 17, and is positioned and oriented so as to be configured for contacting a can when tap tool 10 is affixed to a can (not shown). Gasket 16 may be used to minimize or prevent deformation of the can when tap tool 10 is placed on the can. Also, gasket 16 may provide a substantially secured seal between the can and tap tool 10 to prevent inadvertent loss of the can's contents. Gasket 16 is preferably formed from an elastic material to prevent the refrigerant from leaking while charging, for example rubber.

Figure 5:
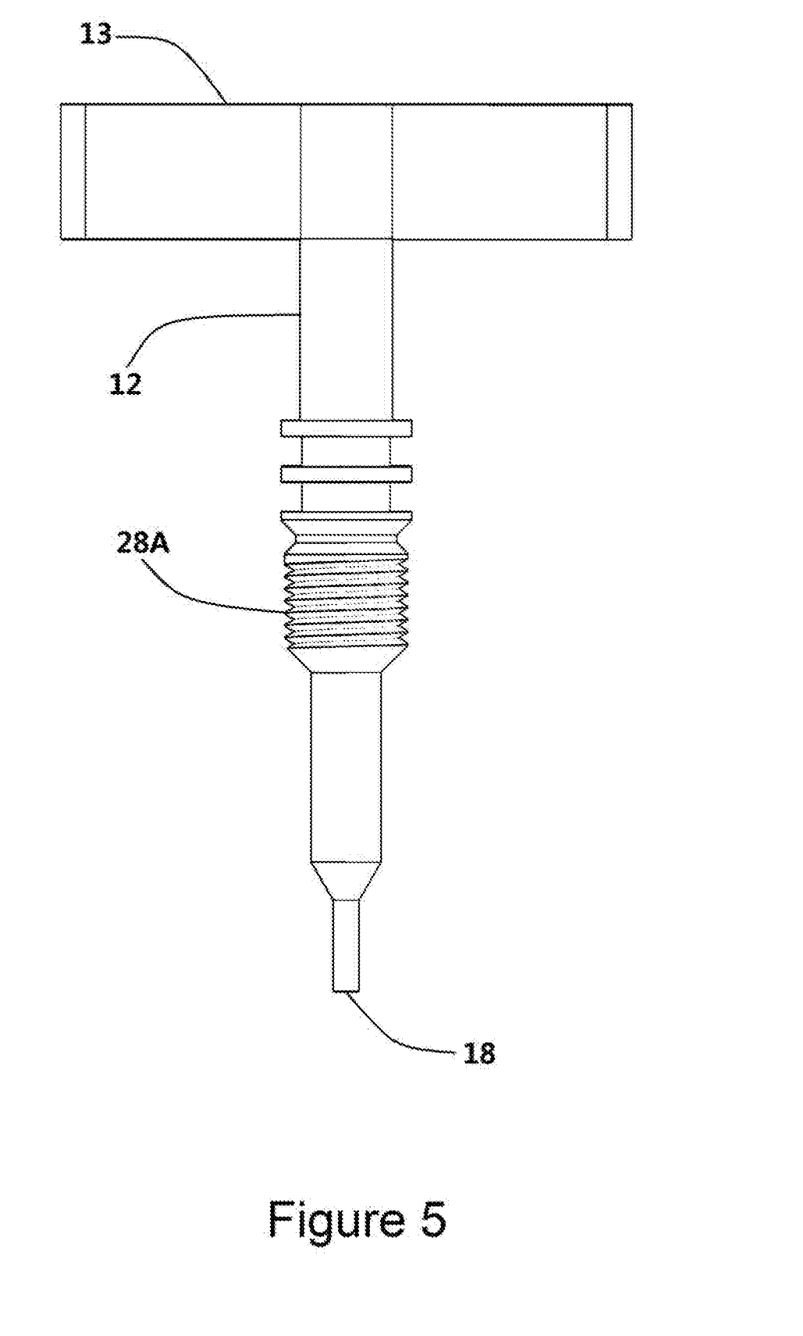
FIG. 5 is an elevated side view of a pin and handle assembly removed from the can tap tool of FIG. 1.
Figure 6:
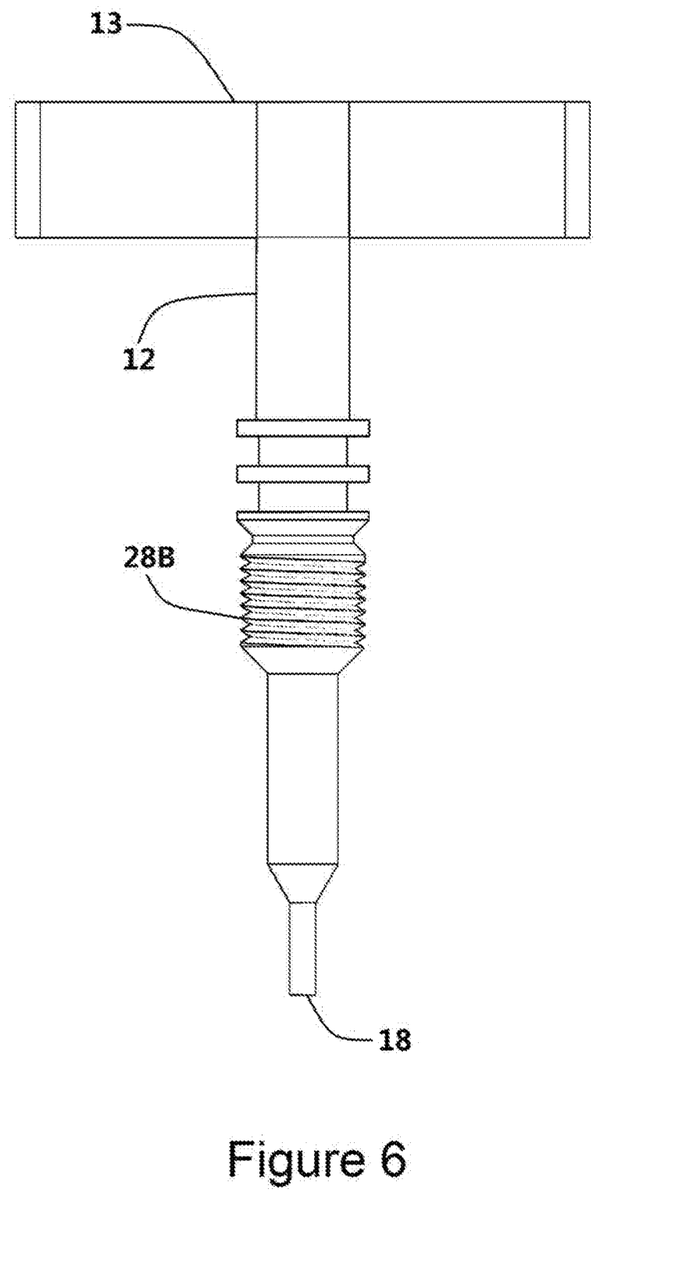
FIG. 6 is an elevated side view of an alternate embodiment of a pin and handle assembly removed from the can tap tool of FIG. 1.
Figure 7:
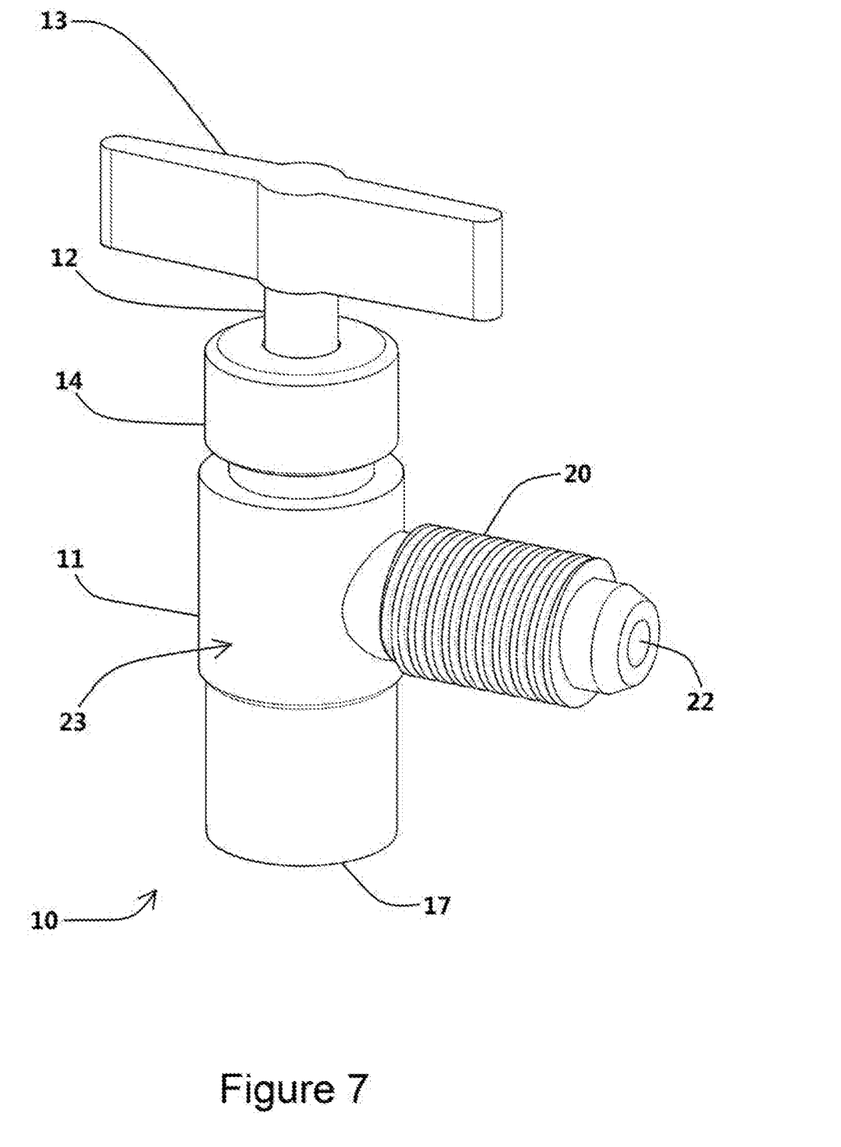
FIG. 7 is an elevated side perspective view of the can tap tool with backflow preventer of FIG. 1.

FIGS. 5 and 6 demonstrate elevated side views of handle 13/pin 12 assemblies. As described previously, handle 13 may be a laterally extending, substantially perpendicular member relative to pin 12 that is affixed thereto by any mechanical, chemical, or otherwise method known in the art. The significant different between FIGS. 5 and 6 are the threads 28A and 28B. As has been described previously herein as internal threads 28, internal threads 28A of FIG. 5 are preferably defined by a right-handed thread pattern, and acceptable embodiments are not intended to be limited based on their angle, spacing, and degree and ascent/decent. Internal thread(s) 28B, by comparison, are preferably defined by a left-handed thread pattern, and similarly are not intended to be limited based on their angle, spacing, and degree and ascent/decent. With respect to internal threads 28A, turning handle 13 clockwise will lower pin 12 as seen in FIG. 1 to engage and open the R-1234yf self-sealing valve 30 and turning handle 13 counter clockwise will raise pin 12 to release and close the R-1234yf self-sealing valve 30. In FIG. 6, internal thread 28B on pin 12 has a reversed thread direction compared to the pin 12 internal thread 28A in FIG. 5. Turning handle 13 counter clockwise will lower pin 12 as seen in FIG. 1 to open the R-1234yf self-sealing valve 30 and turning handle 13 clockwise will raise pin 12 to close the R-1234yf self-sealing valve 30. It may be preferable to configure internal threads 28B in this orientation to avoid the situation whereby a technician opens the self-sealing valve R-1234yf can by turning the handle 13 clockwise to lower the pin, they eventually will loosen the can tap from the can since the R-1234yf can is using a left-handed thread rather a right-handed thread. Loosening in this manner may result in catastrophic and potentially dangerous releases.

The illustrations and examples provided herein are for explanatory purposes and are not intended to limit the scope of the appended claims.

I claim:

1. A can tap for dispensing R-1234yf refrigerant fluid into a refrigeration system from a can of R-1234yf refrigerant, the cap tap comprising:
   a tap body defining a main body with a lower end including a threaded inlet with a one-half inch ACME left-handed thread pattern, an upper end defining a threaded outlet with a one-half inch ACME left-handed thread pattern, an internal thread, and a main body throat located between the main body lower end and the main body upper end, the main body throat in fluidic communication with the threaded inlet and the threaded outlet and defining a lesser diameter than a diameter defined by the threaded inlet;
   a backflow preventer located at a connection between the threaded outlet and the main body throat, the backflow preventer permitting fluid flowing from the main body throat to the threaded outlet, wherein the backflow preventer is configured to prevent the fluid from flowing from the threaded outlet to a can by defining a diameter greater than a portion of the connection between the threaded outlet and the main body throat;

a pin defining a greater diameter at an upper portion that is located more distal the tap body and a lesser diameter at an opposing, lower end located more proximal to, and positioned within, the tap body, including an upper nut secured to the tap body, the lower end defining a blunt depressor suitable for contact with the can defining a top including a self-sealing valve, a flow portion between the upper end and the lower end of the pin located within the main body throat, and at least one O-ring on the upper end to prevent the fluid from leaking through a top of the main body throat, wherein the blunt depressor is configured to engage the self-sealing valve by of the can by lowering the pin and opening the self-sealing valve, and wherein the flow portion allows fluid to flow between the tap body and the pin until the pin is raised and the self-sealing valve is closed; and a gasket located proximate to and circumscribing the threaded inlet to prevent fluid from leaking while charging.

2. The can tap of claim 1 further comprising a handle, the pin attached to the handle and perpendicularly disposed relative thereto.

3. The can tap of claim 2, wherein the blunt depressor is configured to engage the self-sealing valve by of the can by rotating the handle in a counter-clockwise direction which lowers the pin and opens the self-sealing valve, and wherein the flow portion allows fluid to flow between the tap body and the pin until the handle is rotated in a clockwise direction, raising the pin is raised and closing the self-sealing valve.

* * * * *